(12) United States Patent
Richey et al.

(10) Patent No.: US 11,693,792 B2
(45) Date of Patent: Jul. 4, 2023

(54) INFERNAL STORAGE IN CLOUD DISK TO SUPPORT ENCRYPTED HARD DRIVE AND OTHER STATEFUL FEATURES

(71) Applicant: Google LLC, Mountain View, CA (US)

(72) Inventors: Joseph Richey, Seattle, WA (US); Michael Halcrow, Redmond, WA (US); Sergey Karamov, Redmond, WA (US)

(73) Assignee: Google LLC, Mountain View, CA (US)

( * ) Notice: Subject to any disclaimer, the term of this patent is extended or adjusted under 35 U.S.C. 154(b) by 950 days.

(21) Appl. No.: 15/861,844

(22) Filed: Jan. 4, 2018

(65) Prior Publication Data

US 2019/0205267 A1  Jul. 4, 2019

(51) Int. Cl.

| G06F 21/00 | (2013.01) |
| G06F 12/14 | (2006.01) |
| G06F 3/06 | (2006.01) |
| G06F 21/62 | (2013.01) |
| G11B 20/00 | (2006.01) |
| G06F 21/78 | (2013.01) |

(52) U.S. Cl.
CPC .......... *G06F 12/1408* (2013.01); *G06F 3/064* (2013.01); *G06F 3/065* (2013.01); *G06F 3/0623* (2013.01); *G06F 3/0665* (2013.01); *G06F 3/0676* (2013.01); *G06F 3/0689* (2013.01); *G06F 21/6218* (2013.01); *G06F 21/78* (2013.01); *G06F 2212/1052* (2013.01); *G06F 2221/2107* (2013.01); *G11B 20/00253* (2013.01)

(58) Field of Classification Search
CPC .... G06F 12/1408; G06F 21/78; G06F 3/0623; G06F 3/064; G06F 3/065; G06F 3/0665; G06F 3/0676; G06F 3/0689; G06F 21/6218; G06F 2212/1052; G06F 2221/2107; G11B 20/00253
USPC ........................................................ 713/193
See application file for complete search history.

(56) References Cited

U.S. PATENT DOCUMENTS

| 8,261,068 | B1 | 9/2012 | Raizen et al. |
| 8,276,140 | B1 * | 9/2012 | Beda, III ............... G06F 9/5077 718/1 |
| 8,510,838 | B1 * | 8/2013 | Sun ....................... G06F 21/566 713/181 |
| 9,098,325 | B2 | 8/2015 | Reddin et al. |
| 9,311,509 | B2 * | 4/2016 | Casper .................... G06F 21/78 |
| 9,582,207 | B1 * | 2/2017 | McCloskey ........... G06F 3/0682 |

(Continued)

OTHER PUBLICATIONS

Zhao, Xin, "Improving the storage manageability, flexibility, and security in virtual machine systems" (Year: 2007).*

(Continued)

*Primary Examiner* — John B King
(74) *Attorney, Agent, or Firm* — Lerner David LLP

(57) ABSTRACT

A cloud implementation of a persisted storage device, such as a disk, is provided. The implementation supports a variety of features and protocols, in full analogy with a physical storage device such as a disk drive. The present disclosure provides for implementing standard eDrive protocols in the cloud by designing internal disk storage, referred to as a "system area," in a virtual disk instance that the virtual disk can potentially utilize for a multitude of disk features. This internal storage can be used to implement eDrive protocols, which use the system area to maintain the necessary internal virtual disk state.

26 Claims, 8 Drawing Sheets

(56) References Cited

U.S. PATENT DOCUMENTS

| | | | |
|---|---|---|---|
| 9,712,495 B2 | 7/2017 | Nagpal et al. | |
| 2005/0091491 A1* | 4/2005 | Lee | H04L 9/0825 |
| 2007/0088810 A1* | 4/2007 | Lamb | G06F 3/0664 709/223 |
| 2007/0250560 A1* | 10/2007 | Wein | H04L 67/1008 709/201 |
| 2011/0239213 A1* | 9/2011 | Aswani | G06F 9/45558 718/1 |
| 2013/0132950 A1* | 5/2013 | McLeod | G06F 9/45558 718/1 |
| 2013/0185480 A1* | 7/2013 | Newell | G06F 12/023 711/103 |
| 2013/0290668 A1* | 10/2013 | Na | G06F 12/08 711/203 |
| 2014/0201734 A1* | 7/2014 | McMullan | H04L 67/025 718/1 |
| 2015/0067349 A1* | 3/2015 | Werner | H04L 9/0897 713/189 |
| 2015/0120741 A1* | 4/2015 | Abe | G06F 16/181 707/740 |
| 2015/0341171 A1* | 11/2015 | Werner | G06F 21/6218 380/244 |
| 2017/0017422 A1* | 1/2017 | Oshins | G06F 3/0665 |
| 2017/0329625 A1* | 11/2017 | Li | G06F 9/45558 |
| 2018/0059978 A1* | 3/2018 | Peng | G06F 3/0689 |
| 2018/0074724 A1* | 3/2018 | Tremblay | G06F 9/5016 |
| 2018/0232141 A1* | 8/2018 | Avraham | G06F 12/10 |
| 2018/0307435 A1* | 10/2018 | van Riel | G06F 3/0673 |
| 2019/0026476 A1* | 1/2019 | Van Riel | G06F 3/0641 |
| 2019/0042764 A1* | 2/2019 | Durham | G06F 21/57 |

OTHER PUBLICATIONS

Criswell, John, Nathan Dautenhahn, and Vikram Adve. "Virtual Ghost: Protecting Applications from Hostile Operating Systems." Proceedings of the 19th International Conference on Architectural Support for Programming Languages and Operating Systems. ACM, 2014. 81-96 (Year: 2014).*

"Enterprise Self-Encrypting Drives User Guide—Part 1." Sep. 24, 2015 (Sep. 24, 2015), XP055568249, Retrieved from the Internet: <https://www.seagate.com/files/staticfiles/support/docs/manual/Interface%20manuals/100515636b.pdf>. [retrieved on Mar. 13, 2019], 32 pages.

International Search Report and Written Opinion for PCT Application No. PCT/US2019/012167 dated Mar. 22, 2019. 14 pages.

International Preliminary Report on Patentability for PCT Application No. PCT/US2019/012167 dated Jul. 16, 2020. 8 pages.

Office Action for European Patent Application No. 19702498.7 dated May 13, 2022. 7 pages.

Virtualization. Wikipedia. Nov. 8, 2017. Retrieved from the Internet on Dec. 5, 2022: <https://en.wikipedia.org/w/index.php?title=Virtualization&oldid=809282098>. 7 pages.

Office Action for European Patent Application No. 19702498.7 dated Nov. 24, 2022. 8 pages.

* cited by examiner

INFERNAL STORAGE IN CLOUD DISK TO SUPPORT ENCRYPTED HARD DRIVE AND OTHER STATEFUL FEATURES

BACKGROUND

The Trusted Computing Group (TCG) has established a Storage Security Subsystem Class (SSC) supporting Self-encrypting Drives (eDrives) in the Opal 2.01 specification. Major drive vendors have implemented this specification. eDrives persist some state information about contiguous subsections of the drive called "bands," and each band has a unique guest-provisioned PIN that protects it. The drive transparently encrypts data in each band with the band's key. The operating system configures bands and provisions secrets enabling access to the bands.

Some commercial drive encryption applications, such as Microsoft® BitLocker®, support eDrives by provisioning band configuration and secrets to a drive compliant with Opal 2.01 and IEEE 1667. Delegating encryption to the drive may result in an increase in system performance. Cloud platforms, such as Google® Compute Engine, may enable encryption in all virtual disk instances, such as Persistent Disks (PD), by default. Such encryption uses an authenticated encryption mode, which provides essential protection against a variety of attacks that threaten data confidentiality and authenticity. Each disk currently supports only one immutable keyset, where each key in the set protects a snapshot group for the entire logical block address (LBA) range of the disk. A cluster management layer provisions the keysets to virtual disk instances when launching them.

Currently, hardware Self-encrypting Drive (SED) is a physical disk drive supporting security protocols that perform internal encryption and decryption of the data on disk. SED requires a physical disk to support persisted internal state, which in turn requires a dedicated storage that is internal to the disk, accessible only by that disk. The internal storage may be supplied as an internal memory chip or as a reserved area on the physical disk accessible only by the controller on physical disk drive. The specific implementation of the internal memory on the disk is transparent to a user of the physical disk drive and is manufacturer-specific. However, because SED is limited to a physical disk drive, its use is limited by factors such as convenience and expense.

BRIEF SUMMARY

A cloud implementation of a persisted storage device, such as a disk, is provided. The implementation supports a variety of features and protocols, in full analogy with a physical storage device such as a disk drive. The present disclosure provides for implementing standard eDrive protocols in the cloud by designing internal disk storage, referred to as a "system area," in a virtual disk instance that the virtual disk can potentially utilize for a multitude of disk features. This internal storage can be used to implement eDrive protocols, which use the system area to maintain the necessary internal virtual disk state.

One aspect of the disclosure provides a method for supporting encrypted hard drives in a virtual disk storage system. This method includes receiving a request to create a virtual disk instance that supports encrypted hard drive protocols, instantiating, with a virtual machine, a virtual disk in response to the request, and creating an internal disk storage area in the virtual disk. The internal storage area is exposed to a controller of the virtual disk, and used to implement the encrypted hard drive protocols. The encrypted hard drive protocols use the internal disk storage area to maintain an internal disk state.

In some examples, the internal disk storage area is implemented as a dedicated block backend. The dedicated block backend may expose capability to perform system input/output operations to a header of a block device. The dedicated block backend may include a first backend for writing disk-internal data to the internal disk storage area, and a second backend for implementing the encrypted drive protocols. The second backend may be stacked above the first backend.

The method may further include accepting, by a virtio-SCSI layer, secure protocol requests, translating, by the virtio-SCSI layer, the secure protocol requests into logical requests, and providing the logical requests to the first backend. The internal disk storage area may not be directly accessible by a guest operating system. In such a case, the method may further include receiving, at a block backend, an input/output request from the guest operating system, adjusting an input/output offset for the input/output request by incrementing the input/output offset by a size of the internal disk storage area, and processing the input/output request. The size of the internal disk storage area may be obtained from the virtual machine.

According to some examples, the method further includes storing, at a front of a virtual disk storage device of the virtual disk storage system, band metadata. A state of a band of the virtual disk storage device may be modified concurrently with input/output from the virtual disk. The virtual disk storage device may treat the band metadata as part of the disk contents. For example, a record may be appended onto a log file and a mapping reference of the input/output maintained. As another example, the band metadata may be folded into a data storage domain for storing disk data.

Another aspect of the disclosure provides a virtual disk instantiated by a virtual machine. The virtual disk includes a virtual disk backend including the virtual disk and an internal disk storage area, a system area backend providing an interface to the internal disk storage area and an interface to the virtual disk, and a secure block backend stacked above the system area backend, the secure block backend providing encrypted hard drive protocol support, the secure block backend using the internal disk storage area to maintain an internal disk state.

In some examples, the virtual disk may further include a virtio-SCSI layer implemented above the secure block backend. The secure block backend may control changes to a state of a band within the virtual disk. The internal disk storage area includes band metadata corresponding to the band within the virtual disk.

Yet another aspect of the disclosure provides a system for supporting encrypted hard drives in a virtual disk storage system. The system includes one or more virtual machines within a network computing architecture. The one or more virtual machines are adapted to receive a request to create a virtual disk instance that supports encrypted hard drive protocols, instantiate a virtual disk in response to the request, and create an internal disk storage area in the virtual disk, the internal storage area being exposed to a controller of the virtual disk, wherein the internal disk storage area is used to implement the encrypted hard drive protocols, and the encrypted hard drive protocols use the internal disk storage area to maintain an internal disk state.

In some examples, the internal disk storage area is implemented as a dedicated block backend. The dedicated block backend exposes capability to perform system input/output operations to a header of a block device. The dedicated block backend may include a first backend for writing disk-internal data to the internal disk storage area, and a second backend that implements the encrypted drive protocols. The second backend may be stacked above the first backend. The internal disk storage area may not be directly accessible by a guest operating system. Input/output requests received from the guest operating system may be modified by incrementing an input/output offset by a size of the internal disk storage area. The internal disk storage area may include band metadata corresponding to bands of data in the virtual disk.

DETAILED DESCRIPTION

Overview

Figure 1:
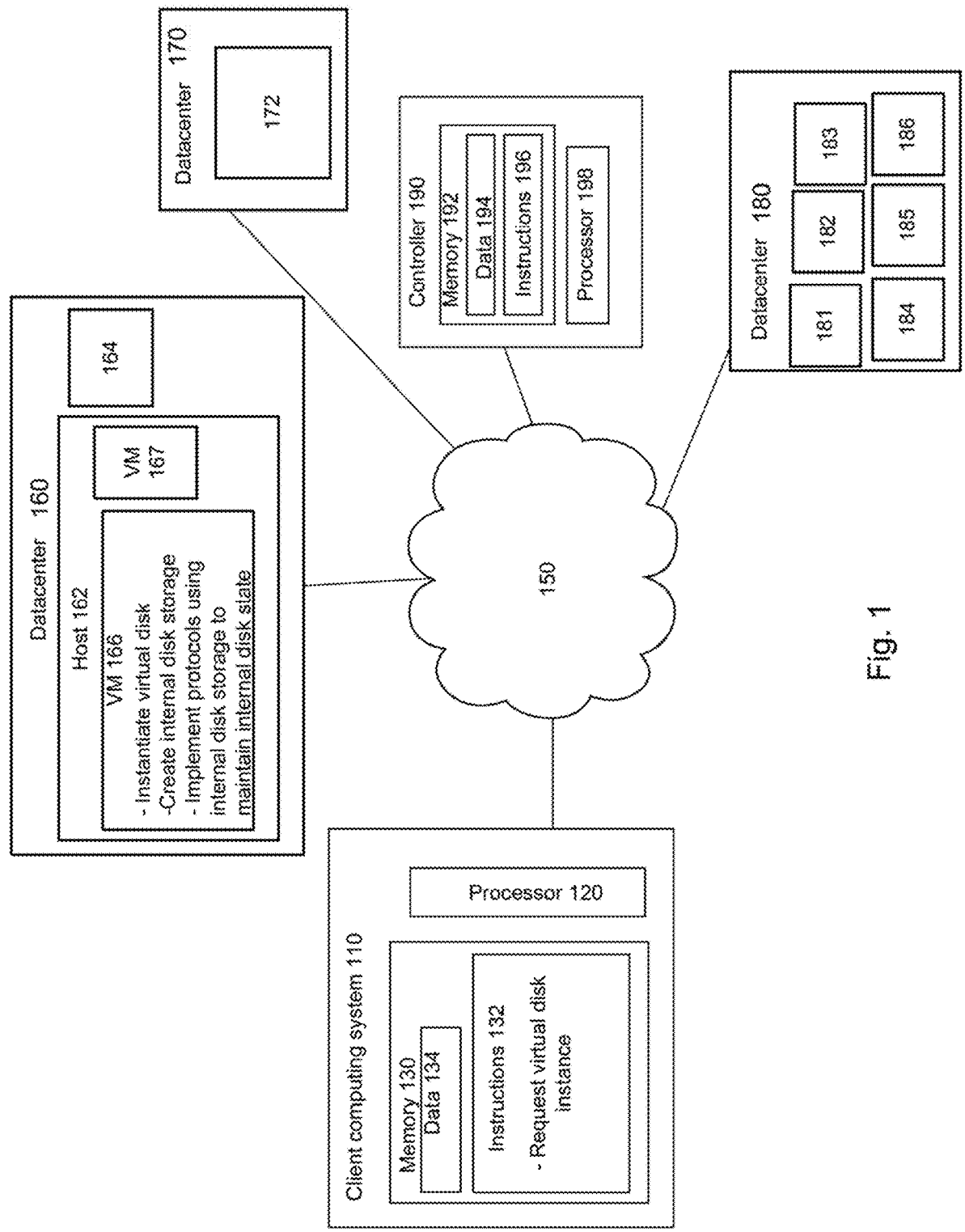
FIG. 1 is a block diagram of an example system according to aspects of the disclosure.

The technology relates generally to implementing, in the cloud, protocols that support encrypted hard drives (eDrives). An internal disk storage, or "system area" is designed such that a disk can potentially utilize it for a multitude of disk features. This internal storage can be used to implement eDrive protocols, which use the system area to maintain a necessary internal disk state.

When a customer specifies that a disk instance that is about to be created needs to support eDrive protocols, cloud infrastructure maintains that information relating to the virtual disk. A new backend exposes separate interfaces to write into the virtual disk, and to write into the system area. For example, the system area support is isolated into a dedicated "system area backend", whereas eDrive support is isolated into a "secure block backend" that is stacked above the system area backend. Accordingly, when the disk gets attached to a virtual machine (VM), the hypervisor dynamically instantiates a block backend of a type that is suitable to the disk properties. For disks that support eDrive protocols, two nested backends are created for the disk. The first backend implements an interface to write disk-internal data to system area, and second backend implements eDrive protocols, employing the capability of the first drive to store eDrive metadata in the system area.

The disk's system area is internal memory exposed by a virtual disk storage system to the disk's controller (or its equivalent) for internal needs of the disk. The system area is designed as a reusable internal disk memory made available to any number of features. As such, the reserved system area is implemented as a dedicated block backend, which will expose capability to perform system input/output (JO) operations and will direct them to a header of a block device.

The system area may be positioned at a head of the disk space. In this regard, the system area does not interfere with disk resizing, such as disk hot-grow at the end of the disk space. The system area is not directly accessible by a guest operating system. When processing IO requests from the guest, the system area will be skipped by adjusting the IO offset on regular IO requests. For example, the IO offset will be incremented by the size of the system area. The size of the system area can be obtained from a virtual machine specification when the system area backend is instantiated.

A virtio-SCSI layer accepts secure protocol requests and translates them into protocol-independent logical requests. The new backend will accept the logical requests from virtio-SCSI layer via the system area backend. The overall design and implementation of the system area may be transparent to the virtio-SCSI layer. This results in a highly configurable and scalable solution.

Bands are contiguous ranges of blocks on the disk that a guest can dynamically create, destroy, lock, and unlock. Band metadata, a class of data treated like disk contents, is stored in a reserved section at a front of a virtual disk storage device. For example, a log structured volume (LSV) may be used to store the bands and associated band metadata. Components of the virtual disk storage device will treat the band metadata as part of the disk contents.

The band metadata needs to remain consistent across time, including snapshots. Accordingly, when doing a write to any location, a record is appended onto a log file and a mapping reference is maintained. Consistency between data written by the guest operating system and band information manipulated by the guest operating system should be maintained, for example, in case of a sudden crash or detach of the guest. By folding the metadata into the same data storage domain as the rest of the disk data, strong consistency is guaranteed without significant burdens.

According to an embodiment, there is provided a method for supporting encrypted hard drives in a virtual disk storage system, the method comprising receiving a request to create a virtual disk instance that supports encrypted hard drive protocols, instantiating, with a virtual machine, a virtual disk in response to the request, and creating an internal disk storage area in the virtual disk, the internal storage area being exposed to a controller of the virtual disk, wherein the internal disk storage area is used to implement the encrypted hard drive protocols, and the encrypted hard drive protocols use the internal disk storage area to maintain an internal disk state. The method enables implementation of features of encrypted physical hard drives for a cloud scenario using a virtual disk storage system. In particular, creating the internal disk storage enables implementation of the encrypted hard drive protocols and maintenance of the necessary internal disk state.

According to another embodiment, the internal disk storage area is implemented as a dedicated block backend, with the dedicated block backend exposing capability to perform system input/output operations to a header of a block device. Cloud infrastructure maintains such information relating to the disk. When the virtual disk gets initiated by the virtual machine and the internal disk storage is created, dynamic implementation of the dedicated block backend of a type that is suitable to the properties of the created virtual disk instance is enabled.

According to another embodiment, the dedicated block backend includes a first backend for writing disk-internal data to the internal disk storage area, and a second backend implements the encrypted drive protocols. This enables isolation of the internal storage are into the dedicated "system area" backend, whereas eDrive support is isolated into the "secure block backend" that is preferably stacked above the system area backend.

According to still another embodiment, the method comprises accepting, by a virtio-SCSI layer, secure protocol requests, translating, by the virtio-SCSI layer, the secure protocol requests into logical requests, and providing the logical requests to the first backend. The virtio-SCSI layer provides a virtualized SCSI controller and provides a transparent implementation of the internal disk storage area. According to another embodiment, implementing the dedicated block backend below the virtio-SCSI layer results in a highly configurable and scalable solution.

According to still another embodiment, the method further comprises receiving, from the guest operating system, an input/output request, adjusting an input/output offset for the input/output request by incrementing the input/output offset by a size of the internal disk storage area, and processing the input/output request. This enables that internal disk storage area is not directly accessible by a guest operating system.

According to a particular embodiment, the size of the internal disk storage area is obtained from the virtual machine when the virtual disk is instantiated by the virtual machine according to the virtual machine specification.

Example Systems

FIG. 1 illustrates an example system including a distributed computing environment. A plurality of datacenters 160, 170, 180 may be communicatively coupled, for example, over a network 150. The datacenters 160, 170, 180 may further communicate with one or more client devices, such as client 110, over the network 150. Thus, for example, the client 110 may execute operations in "the cloud." In some examples, the datacenters 160, 170, 180 may further communicate with a controller 190.

Each client 110 may be a personal computer, intended for use by a person having all the internal components normally found in a personal computer such as a central processing unit (CPU), CD-ROM, hard drive, and a display device, for example, a monitor having a screen, a projector, a touch-screen, a small LCD screen, a television, or another device such as an electrical device that can be operable to display information processed by processor 120, speakers, a modem and/or network interface device, user input, such as a mouse, keyboard, touch screen or microphone, and all of the components used for connecting these elements to one another. Moreover, computers in accordance with the systems and methods described herein may include devices capable of processing instructions and transmitting data to and from humans and other computers including general purpose computers, PDAs, tablets, mobile phones, smartwatches, network computers lacking local storage capability, set top boxes for televisions, and other networked devices.

The client 110 may contain a processor 120, memory 130, and other components typically present in general purpose computers. The memory 130 can store information accessible by the processor 120, including instructions 132 that can be executed by the processor 120. Memory can also include data 134 that can be retrieved, manipulated or stored by the processor 120. The memory 130 may be a type of non-transitory computer readable medium capable of storing information accessible by the processor 120, such as a hard-drive, solid state drive, tape drive, optical storage, memory card, ROM, RAM, DVD, CD-ROM, write-capable, and read-only memories. The processor 120 can be a well-known processor or other lesser-known types of processors. Alternatively, the processor 120 can be a dedicated controller such as an ASIC.

The instructions 132 can be a set of instructions executed directly, such as machine code, or indirectly, such as scripts, by the processor 120. In this regard, the terms "instructions," "steps" and "programs" can be used interchangeably herein. The instructions 132 can be stored in object code format for direct processing by the processor 120, or other types of computer language including scripts or collections of independent source code modules that are interpreted on demand or compiled in advance.

The data 134 can be retrieved, stored or modified by the processor 120 in accordance with the instructions 132. For instance, although the system and method is not limited by a particular data structure, the data 134 can be stored in computer registers, in a relational database as a table having a plurality of different fields and records, or XML documents. The data 134 can also be formatted in a computer-readable format such as, but not limited to, binary values, ASCII or Unicode. Moreover, the data 134 can include information sufficient to identify relevant information, such as numbers, descriptive text, proprietary codes, pointers, references to data stored in other memories, including other network locations, or information that is used by a function to calculate relevant data.

Although FIG. 1 functionally illustrates the processor 120 and memory 130 as being within the same block, the processor 120 and memory 130 may actually include multiple processors and memories that may or may not be stored within the same physical housing. For example, some of the instructions 132 and data 134 can be stored on a removable CD-ROM and others within a read-only computer chip. Some or all of the instructions and data can be stored in a location physically remote from, yet still accessible by, the processor 120. Similarly, the processor 120 can actually include a collection of processors, which may or may not operate in parallel.

The datacenters 160-180 may be positioned a considerable distance from one another. For example, the datacenters may be positioned in various countries around the world. Each datacenter 160, 170, 180 may include one or more computing devices, such as processors, servers, shards, or the like. For example, as shown in FIG. 1, datacenter 160 includes computing devices 162, 164, datacenter 170 includes computing device 172, and datacenter 180 includes computing devices 181-186. According to some examples, the computing devices may include one or more virtual machines running on a host machine. For example, computing device 162 may be a host machine, supporting a plurality of virtual machines 166, 167 running an operating system and applications. While only a few virtual machines 166, 167 are illustrated in FIG. 1, it should be understood that any number of virtual machines may be supported by any number of host computing devices. Moreover, it should be understood that the configuration illustrated in FIG. 1 is merely an example, and that the computing devices in each of the example datacenters 160-180 may have various structures and components that may be the same or different from one another.

Programs may be executed across these computing devices, for example, such that some operations are executed by one or more computing devices of a first datacenter while other operations are performed by one or more computing devices of a second datacenter. In some examples, the computing devices in the various datacenters may have different capacities. For example, the different computing devices may have different processing speeds, workloads, etc. While only a few of these computing devices are shown, it should be understood that each datacenter 160, 170, 180 may include any number of computing devices, and that the number of computing devices in a first datacenter may differ from a number of computing devices in a second datacenter. Moreover, it should be understood that the number of computing devices in each datacenter 160-180 may vary over time, for example, as hardware is removed, replaced, upgraded, or expanded.

In some examples, each datacenter 160-180 may also include a number of storage devices (not shown), such as hard drives, random access memory, disks, disk arrays, tape drives, or any other types of storage devices. The datacenters 162, 172, 182 may implement any of a number of architectures and technologies, including, but not limited to, direct attached storage (DAS), network attached storage (NAS), storage area networks (SANs), fibre channel (FC), fibre channel over Ethernet (FCoE), mixed architecture networks, or the like. The datacenters may include a number of other devices in addition to the storage devices, such as cabling, routers, etc. Further, in some examples the datacenters 160-180 may be virtualized environments. Further, while only a few datacenters 160-180 are shown, numerous datacenters may be coupled over the network 150 and/or additional networks.

In some examples, the controller 190 may communicate with the computing devices in the datacenters 160-180, and may facilitate the execution of programs. For example, the controller 190 may track the capacity, status, workload, or other information of each computing device, and use such information to assign tasks. The controller 190 may include a processor 198 and memory 192, including data 194 and instructions 196, similar to the client 110 described above.

Client 110, datacenters 160-180, and control 190 can be capable of direct and indirect communication such as over network 150. For example, using an Internet socket, a client 110 can connect to a service operating on remote servers through an Internet protocol suite. Servers can set up listening sockets that may accept an initiating connection for sending and receiving information. The network 150, and intervening nodes, may include various configurations and protocols including the Internet, World Wide Web, intranets, virtual private networks, wide area networks, local networks, private networks using communication protocols proprietary to one or more companies, Ethernet, WiFi (e.g., 702.71, 702.71b, g, n, or other such standards), and HTTP, and various combinations of the foregoing. Such communication may be facilitated by a device capable of transmitting data to and from other computers, such as modems (e.g., dial-up, cable or fiber optic) and wireless interfaces.

Client 110 may request that a virtual disk instance be created in the cloud. Such request may be handled by the controller 190 and/or one or more of the computing devices in datacenters 160-180. By way of example only, as shown in FIG. 1, the request may be received by host computing device 162. In response, virtual machine 166 instantiates a virtual disk and creates an internal disk storage area in the virtual disk. The internal disk storage area is exposed to a controller of the virtual disk, such as the virtio-SCSI driver. Using the internal disk storage area, the virtual machine 166 implements encrypted hard drive protocols. The encrypted hard drive protocols use the internal disk storage area to maintain an internal disk state.

The internal disk state is a persisted state which can be accessed and used by the disks controller. It is transparent, or not directly visible, to the disks host, such as the OS. The internal disk state may include, for example, persisted bands state, such as described below in connection with FIG. 5. The internal disk state may also be used, for example, for storing keys for inline cryptographic engine (ICE). Supporting persisted internal disk state is necessary for any disk features which are by nature stateful, where the state is encapsulated within the disk and cannot be directly accessed by the disk's host.

Isolating the persisted internal disk state away from the disk's host provides security. For SED, a data encryption key and a list of protected data ranges are encapsulated within the drive. This prevents any malicious host from being able to retrieve the data encryption key and decrypt the disk data. The data encryption key is generated internally to the drive, and remains inaccessible to any host, including a host with which the SED is bound at the time of enabling the protection. Accordingly, there is no way to attach the drive to an arbitrary host and be able to decrypt its data. The only way the data can be decrypted, with exception of a recovery scenario, is when the drive is attached to the host with which the drive was originally bound, on which the drive encryption application protection was enabled. That host contains a host-specific trusted platform module (TPM) protector. The TPM protector supplies a PIN to the drive via the eDrive protocol. The PIN supplied by the TPM protector is the PIN with which the protection was originally enabled on this host. Thus, the drive remembers this PIN and stores it internally. The PIN tells the drive that it is attached to the correct host. Once the drive knows it is attached to the correct host, it uses the internally stored data encryption key to decrypt its data internally to the drive. Accordingly, the eDrive protocol allows the proper host to match the host-specific TPM state against the encapsulated internal state of the drive to assure that the data can be decrypted only on the host to which the drive is bound.

Figure 2:
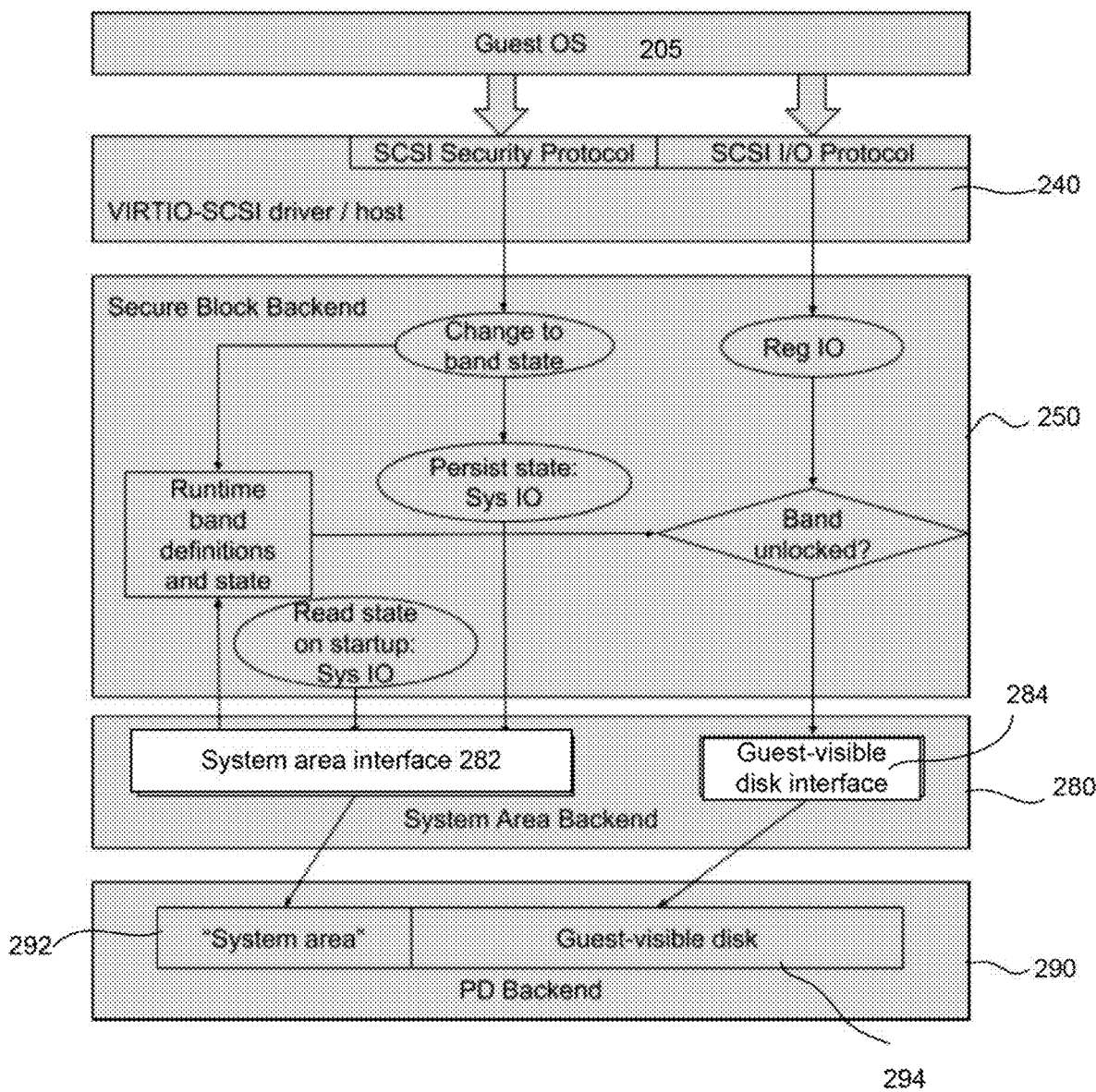
FIG. 2 illustrates an example of a block backend of a disk instance according to aspects of the disclosure.

FIG. 2 illustrates an example of a block backend 200 of a disk instance, such as the disk instance created by the virtual machine 166. As shown, the block backend 200 includes a virtual disk backend 290, a system area backend 280 stacked above the virtual disk backend 290, and a secure block backend 250 stacked above the system area backend 280.

The virtual disk backend 290 includes system area 292 at a front end, and virtual disk 294. The system area 292 is a reusable internal disk memory made available to any number of features. The system area 292 is exposed by the virtual disk to the disk's controller, or its equivalent, for internal needs of the disk 294.

The virtual disk 294 may be visible to guest operating system (OS) 205, such as the OS for the virtual machine that created the disk instance. Contents of the system area 292, however, are opaque to the virtual disk 294. Moreover, the system area 292 is not directly accessible by the guest OS 205, and is used for internal needs of the disk.

The system area 292 can be used by the system to store disk-internal system data for any number of purposes or to serve any number of features. For example, as mentioned above, the internal disk state may also be used for storing keys for ICE, or for any disk features which are by nature stateful.

The system area 292 includes band metadata, which is a class of data treated like disk contents. Bands are contiguous ranges of blocks on the disk that the guest can dynamically create, destroy, lock, and unlock. Components of the virtual disk 294 may treat the band metadata as part of the disk contents. The system area 292 may be a fixed size. In some examples, in order to increase the system area a new disk would need to be created.

When processing input/output (I/O) requests from the guest 205, the system area 292 may be skipped by adjusting an IO offset on regular IO requests. For example, the I/O offset may be incremented by a value corresponding to a size of the system area 292. The offset correction can be obtained from, for example, the virtual machine specification when the system area backend 280 is instantiated.

In some alternative examples, the system area may be positioned at a back end of the disk 294. In such examples, the regular IO requests would not need to be offset. However, this would inhibit an ability for hot grow of the disk 294. For example, the system area, if placed at an end of the disk space, would need to be moved. In instances where disk 294 is designed to consume metadata from other sources without updating the metadata, moving the system area may not be transactionally safe.

Support for the system area is isolated into the system area backend 280, which is dedicated to supporting the system area 292. The system area backend 280 exposes separate interfaces to write into the disk 294, and to write into the system area 292. For example, system area interface 282 may be used to write into the system area 292, while guest-visible disk interface 284 may be used to write into the virtual disk 294. The system area 292 is reserved for system-only writes.

The secure block backend 250 provides eDrive support, and may be dedicated to providing such support. For example, the secure block backend 250 may implement security protocols, persist received changes to bands state by translating them into IO requests sent to the system area 292, initialize band metadata, etc.

Any layers above the system area backend 280 may only see the logical drive size without the system area 292 that contains the system metadata. Layers above the system area backend 280 may include virtio-SCSI 240 and other guest block I/O frontends.

Figure 3:
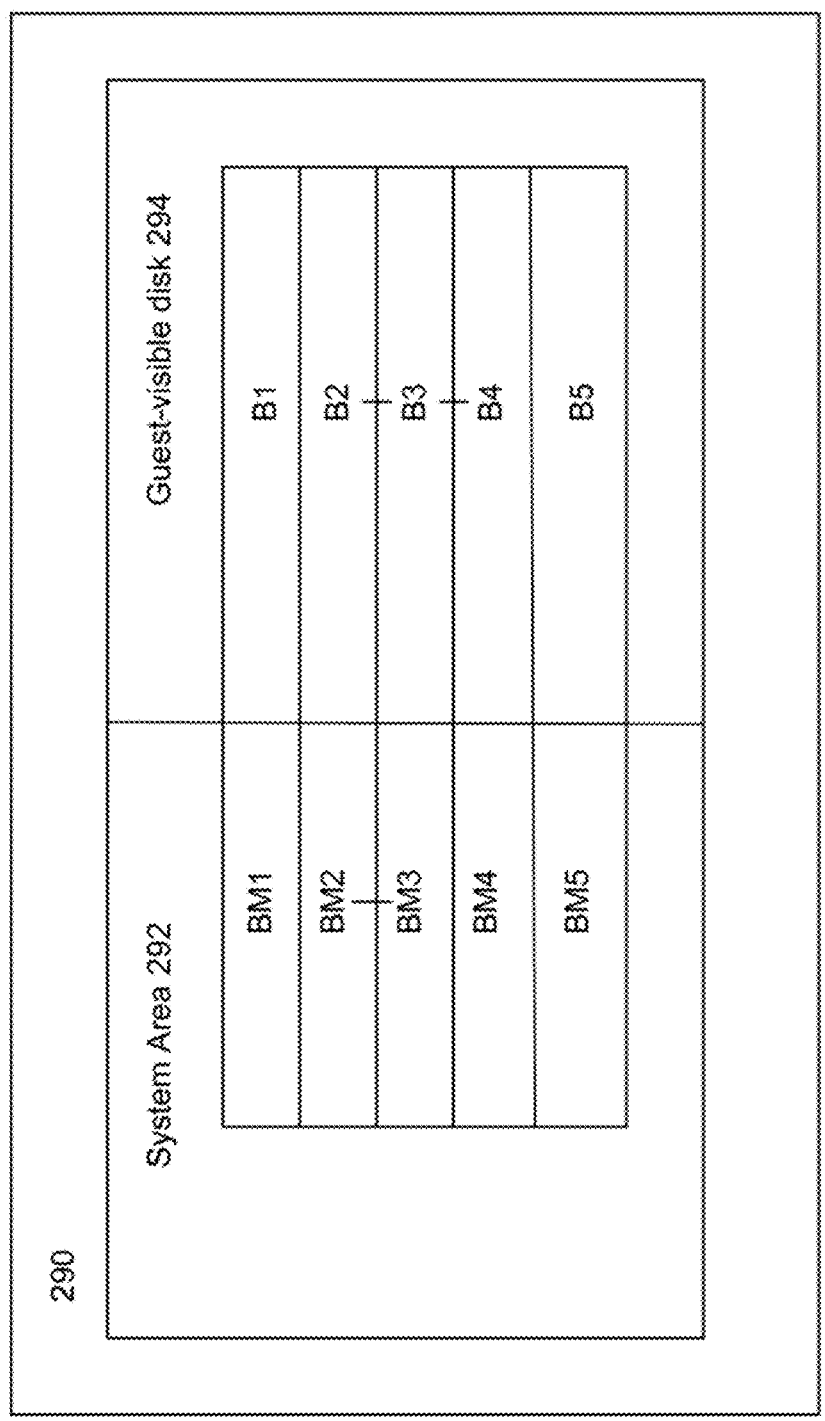
FIG. 3 illustrates an example of bands and band metadata within a virtual disk backend according to aspects of the disclosure.

FIG. 3 illustrates an example of bands and band metadata within the virtual disk backend 290. As shown, guest visible disk 294 includes a plurality of bands of data B1-B5. The bands B1-B5 can be dynamically created, destroyed, locked, or unlocked by the guest OS. While the example of FIG. 3 illustrates only a few bands, it should be understood that the actual number of internal blocks in the virtual disk may be varied. System area 292 includes a plurality of blocks of metadata BM1-BM5 corresponding to the bands of data B1-B5. The band metadata BM1-BM5 is updated consistently with the bands B1-B5.

Newly created bands start out in the unlocked state. The guest locks a band by providing a PIN, such as a 128-bit value. Once a band is locked, any I/O that the guest attempts on the band will fail. The guest can unlock the band by providing the same PIN. The PIN may be treated as an access token or as a wrapping key. Either approach provides a customer with the ability to protect virtual disk contents with Trusted/Secure Boot. In this regard, customers gain protections against unauthorized actions within a project compromising data on disks.

Changing a band state may conflict with processing out-of-order in-flight IO requests. System IOs with band commands can be interlaced with regular IOs, and the block device gives no assurances about preserving IO request processing order, regardless of the type of request. In particular, the order of system IO and regular IO requests is not preserved either. The OS driver may synchronize changing band state with IO requests. Accordingly, when changing band state, such as locking or unlocking a band, there is no need to pause/flush/unpause the disk.

Returning to FIG. 2, the block backend 200 allows for supporting virtual disk snapshots, since each snapshot may automatically capture respective content of the system area 292. Snapshots will include the system area 292, and so any given snapshot will include changes that the guest OS 205 has made to the band configuration prior to that snapshot.

A snapshot is not always associated with a particular existing disk. For example, snapshots may outlive disks if a user deletes the disk after taking a snapshot. For each snapshot, metadata such as disk name, disk size, and system area size may be preserved. Metadata such as system area size may become a part of the virtual machine specification, making it unnecessary to track a version of eDrive feature or any other disk feature. The version will in effect be reflected in the disk metadata. A given instance of the drive may be created with a non-modifiable system area size. In this example, the controller (e.g., the secure block backend 280) can decide which features are supported based on the disk metadata.

The system area block backend 280 may perform offset and size validation when processing an IO request. In some examples, it is made aware of a type of arrived IO request. For example, the system area backend 280 may distinguish system IO requests from regular IO requests, allow system IO request to read/write only from/to the system area 292, and allow the regular IO request to read/write only outside of the system area 292. When a controller layer, such as the secure block backend 250, generates a system IO request, the system IO request may be passed to the system area block backend 280 accompanied with a corresponding "IO type" flag, indicating whether it is a system IO request or a regular IO request. Thus, the IO requests flagged as "regular" will undergo offset correction, whereas "system" IO requests will arrive already with proper offset. The validation logic will then be extended to validate that each IO type fits within respective bounds. For example, system IO should fit within the bounds of the system area 292, and regular IO should fit within the bounds of the remaining disk space in the guest visible disk 294.

Figure 4:
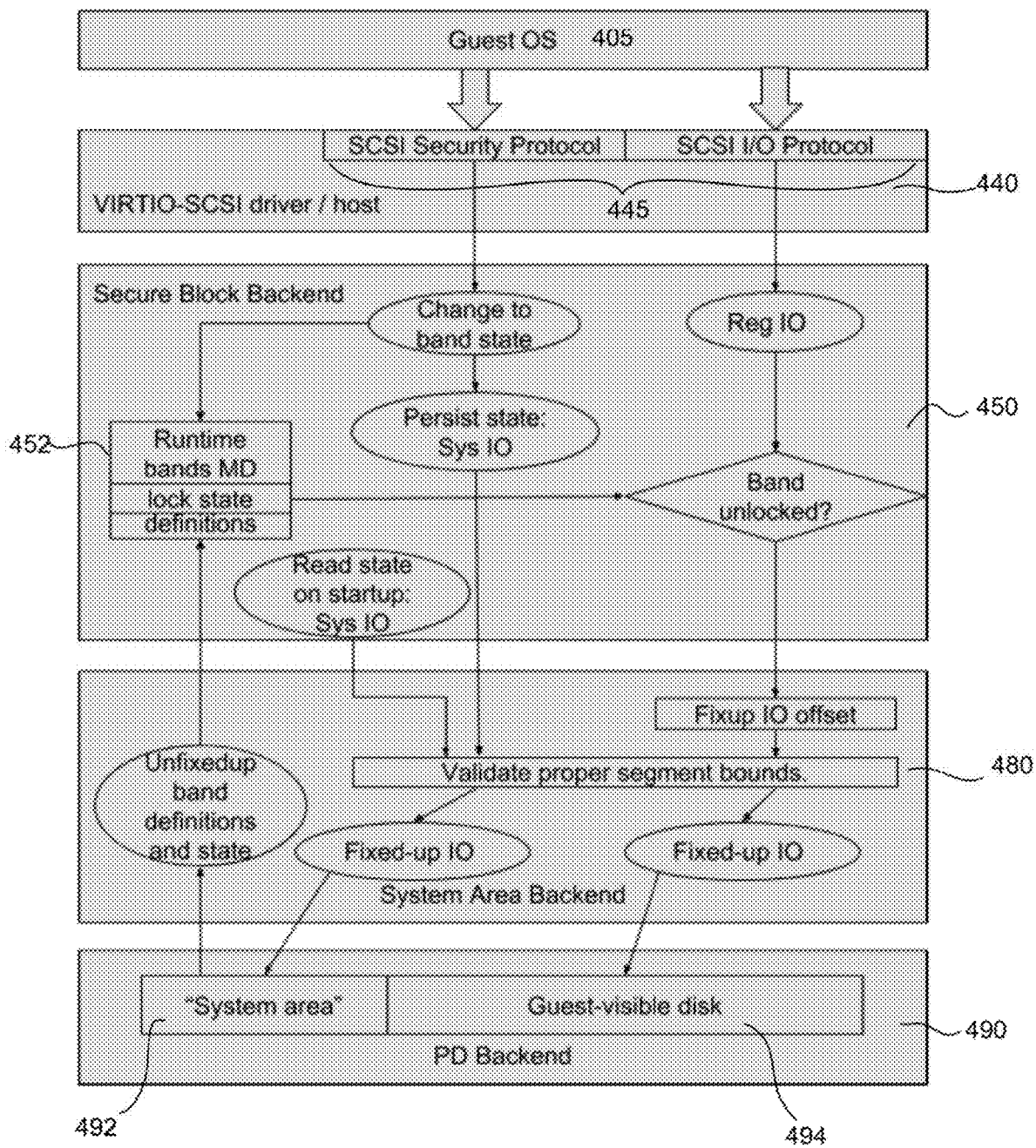
FIG. 4 illustrates another example of a block backend of a disk instance according to aspects of the disclosure.

According to some examples, a nanny feature implements processing SCSI Security Protocols required to support eDrives functionality, persisting band metadata in the system area, and performing band-based IO filtering. FIG. 4 illustrates an example of this feature. As shown in FIG. 4, regular IO requests are propagated from a guest OS 405 to a block device through VIRTIO-SCSI layer 440 and to secure block backend 450. System IO requests are generated from the secure block backend 450 to system area backend 480, and further to virtual disk block backend 490.

The virtio-SCSI layer 440 includes a frontend interface 445. The frontend interface 445 may be used to implement security and IO protocols. The frontend interface 445 may also be used to issue calls to the secure block backend 450 in response to commands received from the guest 405.

When a disk gets attached to a VM, the band metadata will be loaded from system area 492 into a run-time in-memory representation 452 in the secure block backend 450. The band metadata will be updated as SCSI Security Protocol commands arrive and get translated. When the incoming SCSI command changes a band state, the in-memory representation 452 of the bands state will be updated only upon successfully persisting the new state in the system area 492.

The virtio-SCSI driver 440 parses and interprets the received SCSI Security Protocol commands. The virtio-SCSI driver 440 passes a logical equivalent of the commands, which may be agnostic to a SCSI transport protocol, to the secure block backend 450.

The secure block backend 450 will persist received changes to bands state by translating them into IO requests sent to the system area 492 of disk 494. The system IO requests may be sent to the system area backend 480 accompanied with a flag indicating that the IO request is generated by the system and not by the guest 405. If change is successfully persisted, the secure block backend 450 will apply the change to the run-time in-memory state 452, which will be used to validate and filter IO requests. The secure block backend 450 will validate arriving IO requests against the lock state of the respective band, and will fail IO requests arriving to locked bands.

Changes may be persisted in the system area 492 atomically, or in a transactional manner. For example, changes persisted atomically should always be complete. Changes persisted in a transactional manner may be in a partially persisted state, but transactionally recoverable.

In some examples, rather than performing the foregoing processing of IO requests in the secure block backend 450, it may be performed elsewhere in a virtual disk system. For example, a virtual disk processing stack may be decoupled from the nanny feature and isolated into agent jobs. Performing band-based IO filtering in the secure block backend 450 alleviates a need to otherwise spread all changes to band states to all agents.

Band metadata can be initialized via the eDrive protocol. Virtual disk instances can be "shielded," preventing access from an unauthorized computing environment, where volumes on the virtual disk were created while the virtual disk instance was attached to a VM. Imported disk instances may support eDrive protocol, and may be "shielded," when they are originally exported from "shielded" disk instances. For example, a disk instance created from a snapshot of a "shielded" instance will result in a "shielded" instance. A disk instance created from a user-supplied image, however, will not be a "shielded" disk instance.

The eDrives feature may support a fixed maximum number of bands. The system area size may be defined to fit all supported bands. A layout of eDrive metadata may be scalable to adding more drive features that may need to utilize the system area 492. The initial layout of eDrive metadata in the system area 492 may not need to factor in or facilitate the features of the drive to be added in the future, since placing the eDrive metadata at the head of the system area 492 does scale. For example, when adding more features, a descriptor block may be placed at a tail of the system area 492. A payload may specify the layout and location of different parts of the system area 492 associated with respective drive features.

Figure 5:
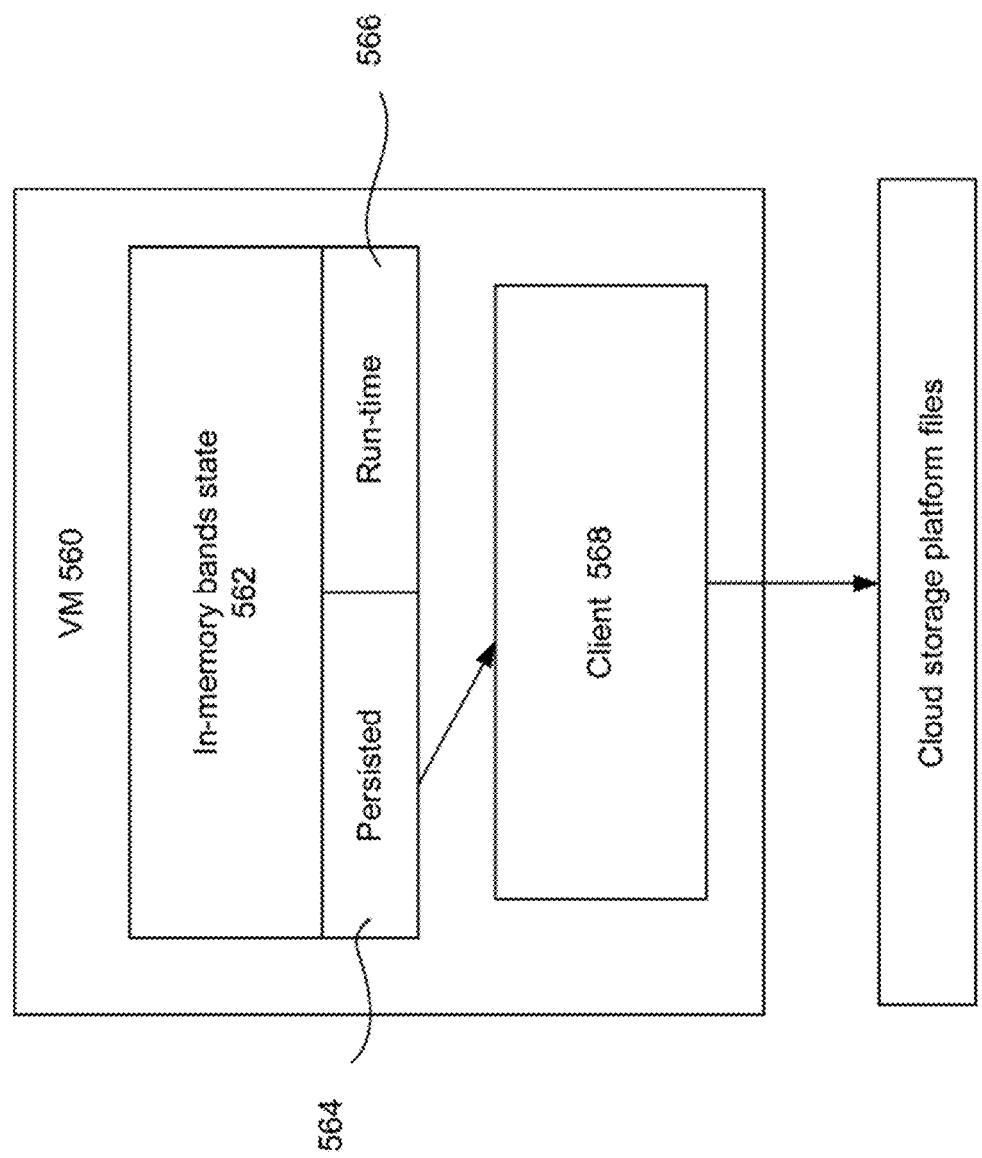
FIG. 5 illustrates an example of an in-memory bands state in a virtual machine according to aspects of the disclosure.

FIG. 5 illustrates an example of an in-memory bands state 562 in a VM 560. The in-memory band state 562 may consist of 2 parts—a persisted part 564 and a runtime-only part 566. A defined band can be in one of several different possible states. For example, the band can be unsecured, with no PIN associated with it. As another example, the band can be secured and locked, where no reads or writes are allowed, or the band can be secured and unlocked, where reads and writes are allowed. When the VM 560 reboots, or when the eDrive gets reattached, the eDrive resets the secured and unlocked state and initializes it to the locked state. Band state that is persisted is stored in the persisted part 564, while band state that was reinitialized at the time of reattaching the eDrive is not persisted. The persisted part 564 will be loaded into memory when disk 590 gets attached. The persisted part 564 of the in-memory state 562, therefore, may be unsecured or secured with a given PIN. The runtime-only in-memory state 566 that is reset to the "locked" state at the time of initialization will be band locked/unlocked. The full in-memory state for a band may include both these parts. The in-memory state for a band may further include a band identifier, a band range, a secured flag PIN, a locked flag, etc.

Figure 6:
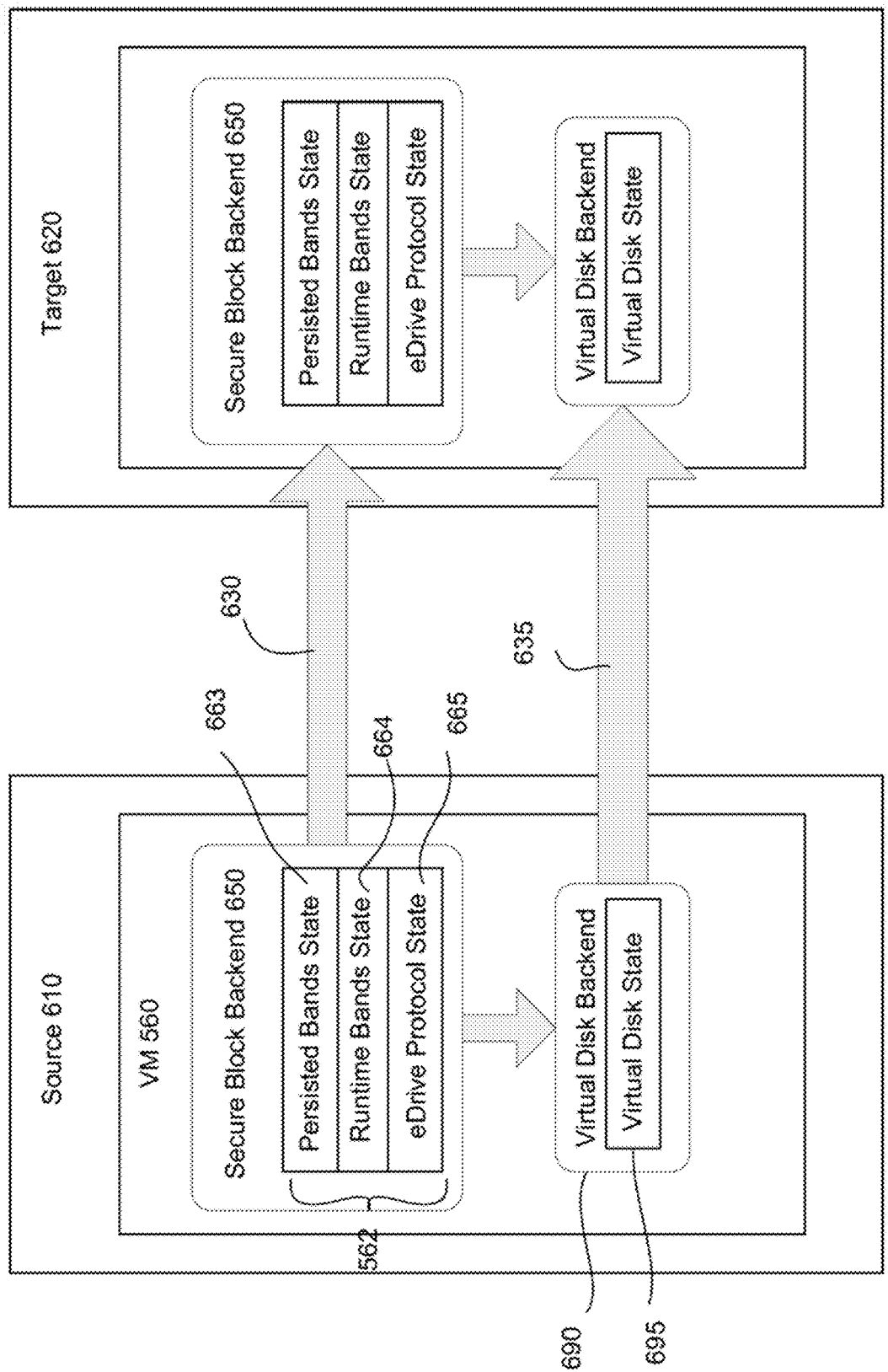
FIG. 6 illustrates an example of live migration of a VM according to aspects of the disclosure.

FIG. 6 illustrates an example of live migration of a VM, such as the VM 560. At the time of VM live migration or upgrade, the in-memory state 562 is delivered from a migration source 610 to a migration target 620. The full in-memory state 562 that needs to be delivered consists of persisted bands state 663, non-persisted or run-time bands state 664, and an eDrive protocol state 665 associated with processing stateful eDrive security protocols. The in-memory state 562 may be included in secure block backend 650, which in this example may include the secure block backend and the system area backend. The secure block backend 650 may register a first migration tunnel 630, and migrate to the target 620 through the first migration tunnel 630. Virtual disk block backend 690, including the virtual disk state 695, may register its own second migration tunnel 635, and migrate to the target 620 independently of the secure block backend 650. The secure block backend 650 may migrate concurrently with or at different times than the virtual disk backend 690. Moreover, each of the secure block backend 650 and the virtual disk backend 690 may migrate in stages or altogether.

Figure 7:
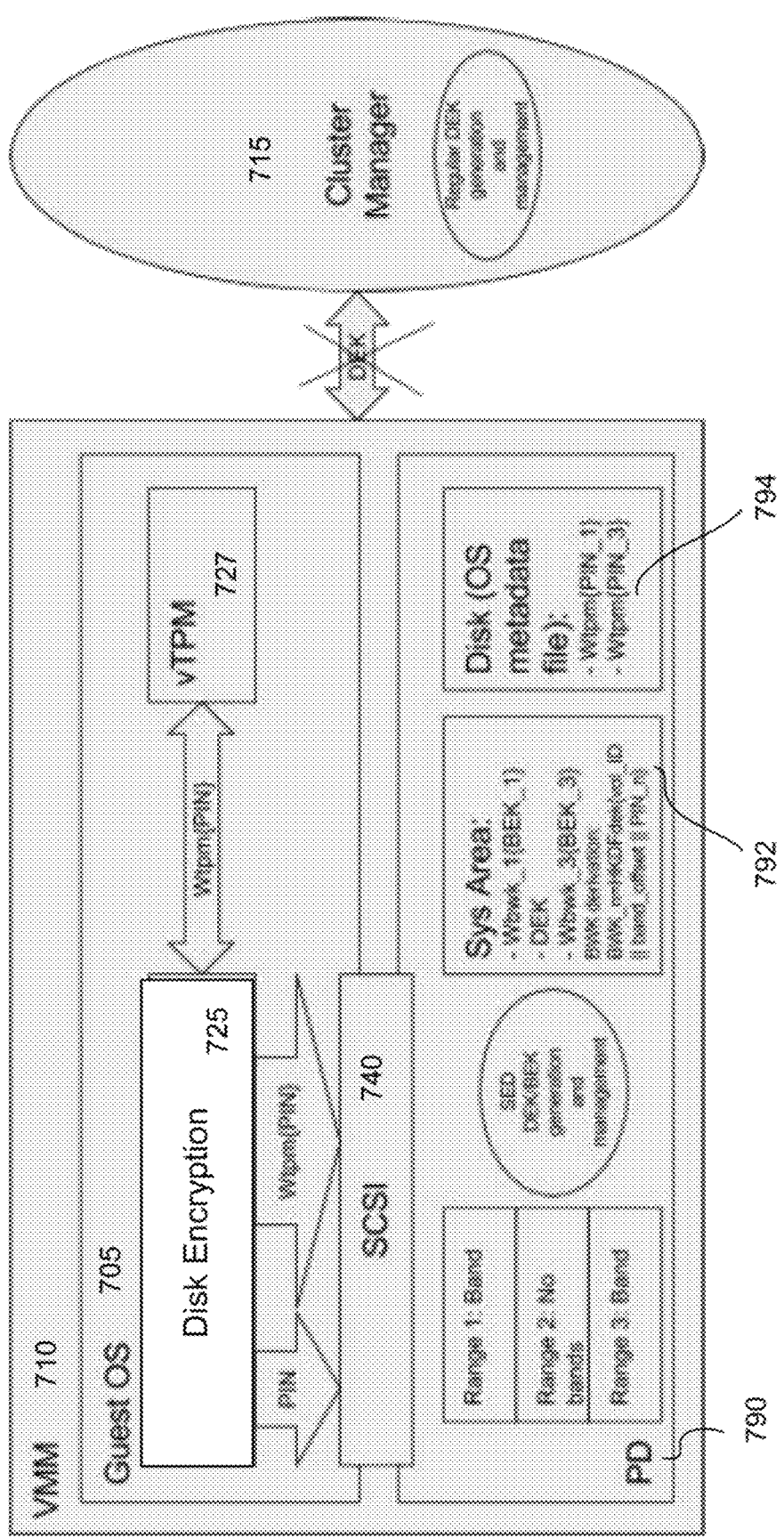
FIG. 7 illustrates an example of virtual disk including a system area in operation with a disk encryption application according to aspects of the disclosure.

Moving the eDrive protocols to the cloud as described above may maintain compatibility with commercial disk encryption applications. FIG. 7 illustrates an example of the virtual disk including the system area in operation with a commercial disk encryption application 725. As shown, virtual machine manager (VMM) 710 running guest OS 705 instantiates virtual disk 790 including system area 792 and disk area 794. The guest OS 705 supports the disk encryption application 725, which communicates with virtual Trusted Platform Module (vTPM) 727. The disk encryption application 725 also communicates with the virtual disk 790 through SCSI layer 740. In this example, the virtual disk drive 790 generates encryption keys internally, and does not employ cluster manager 715. For data ranges not protected by a band, a data encryption key (DEK) is generated. For data within a band, a random band encryption key (BEK) may be generated. The BEK is stored wrapped with the respective band's wrapping key derived from PIN, whereas the PIN is protected by vTPM 727. Accordingly, a trust chain established off the vTPM 727 is established.

Before a band is created in a region of the disk 790, data in that region is encrypted using the DEK, and the DEK is stored unwrapped in the system area 792, which is not visible to the guest OS 705. Once a band is created, a random band encryption key (BEK) will be generated and stored in system area 792 wrapped into a band wrapping key (BWK). All data within the band will be encrypted with a respective BEK. The BWK will be derived from the band's PIN, with the band's offset factored in. If the whole disk is protected by one or more bands, DEK is erased from system area 792.

When a locked self-encrypting drive is powered up, a basic input/output system first sees a shadow disk that is much smaller than the real disk. The software in the shadow disk is read-only, and this software requires a key encryption key (KEK) from a user to unlock the real disk for use and to decrypt a master encryption key (MEK) so the real disk can be read and written to. The shadow disk software stores a cryptographic hash of the KEK so it can recognize if the user gives the right KEK. When the user enters the passcode (KEK) the shadow disk creates a hash of that passcode and compares it with the stored hash of the KEK. If the two match, the MEK is decrypted and put into the encryption/decryption circuit inside the drive. The basic input/output system is called to start from the disk again, but now this is the much bigger real disk with a capacity in gigabytes rather than megabytes, and the operating system boots normally.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 8:
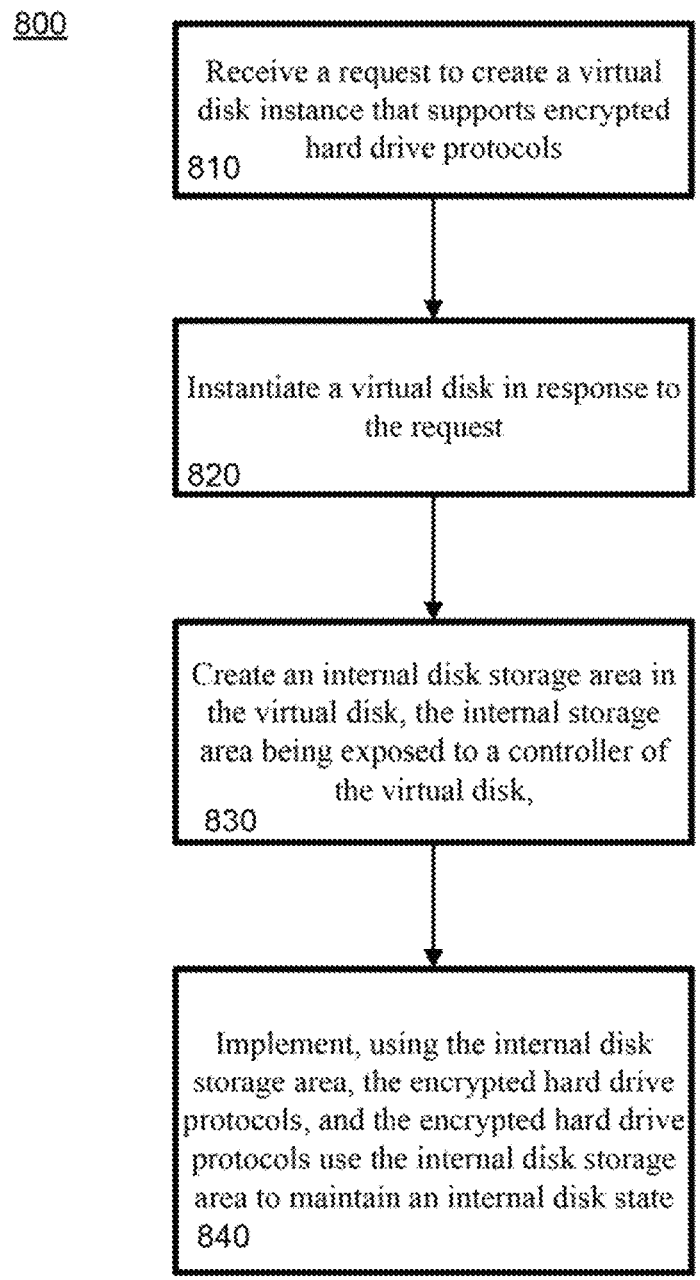
FIG. 8 illustrates an example method of implementing eDrive protocols in the cloud according to aspects of the disclosure.

FIG. 8 illustrates an example method 800 of implementing eDrive protocols in the cloud. The method 800 may be performed, by way of example only, by a virtual machine, such as the virtual machines described in connection with FIG. 1.

In block 810, a request to create a virtual disk instance that supports encrypted hard drive protocols is received. For example, the request may be received from a customer operating a client device. In some example, the customer may also be operating commercial drive encryption applications.

In block 820, a virtual disk is instantiated in response to the request. The disk may be instantiated in a block backend of a type that is suitable to the disk properties. In some examples, the virtual disk may be instantiated within a commercial cloud platform, in a block backend of the cloud platform. In some examples, the disk may have a property that is supports eDrive protocols. In this example, two nested backends may be created for the disk, such as a system area backend and a secure block backend. The virtual disk may be accessible by the guest.

In block 830, an internal disk storage area, such as a "system area," is created in the virtual disk. For example, the system area may be created in the system area backend. The system area may store metadata about eDrive bands. The system area may be exposed to a controller of the virtual disk, but not accessible by a guest operating system. For example, referring to the example of two nested backends mentioned above, the first backend may implement an interface to write disk internal data to the system area. The second backend may implement eDrive protocols, employing the capability of the first backend to store eDrive metadata in the system area. The system area may be positioned at a front end of the system area backend, in front of the guest-accessible virtual disk. In this regard, the system area does not interfere with potential disk hotgrow at an end of the disk space.

In block 840, the system area is used to implement the eDrive protocols, which use the system area to maintain an internal disk state. When receiving regular IO requests from the guest OS, an IO offset for the request may be adjusting by incrementing the IO offset by a size of the system area. In this regard, the regular IO request may skip over the system area and be processed.

The examples described above provide a number of advantages. The system area can be used for a multitude of disk features, including implementing eDrive protocols which use the system area to maintain the internal disk state. With eDrive implemented in the cloud, a number of disk encryption application benefits become available to a cloud customer. By way of example, enablement of the disk encryption application may be performed in 0-time, because the disk is already encrypted. Moreover, granular data protection can be scoped to a virtual machine, as opposed to merely volume granularity. Further, there is no double encryption, and thus resources such as CPU and memory are reduced and cost is reduced for customers. In a virtualized environment where data is encrypted unconditionally on the backend, enabling encryption in a disk encryption application absent eDrive/SED support results in double encryption. For example, the operating system performs encryption independently from the backend, and the backend performs encryption independently from the operating system. With eDrive/SED support in place, the operating system first queries the block device about whether or not the latter supports eDrive/SED capability, and when an affirmative response is received delegates encryption to the SED-capable block device. The implementation of eDrive capability as described above further provides for strong consistency between data written by the guest OS and band information manipulated by the guest OS. For example, by folding the metadata into the same storage domain as the rest of the disk data, strong consistency is guaranteed through existing mechanisms of the cloud platform. This strong consistency includes snapshot support.

Placement of the system area at a head of the disk space is also advantageous. For example, such placement does not interfere with disk hotgrow at an end of the disk space. Moreover, offset adjustment may be performed in the block backend. This makes the system area implementation transparent to a virtio-SCSI layer, while performing processing transparently to the disk backend. Moreover, implementation in the block backend outside of a cloud platform stack and below the virtio-SCSI layer makes the solution highly configurable and scalable to future features.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for supporting encrypted hard drives in a virtual disk storage system, the method comprising:
receiving a request to create a virtual disk instance that supports encrypted hard drive protocols;
instantiating, with a virtual machine, a virtual disk in response to the request; and
creating an internal disk storage area in the virtual disk, the internal disk storage area being exposed to a controller of the virtual disk, wherein the internal disk storage area is used to implement the encrypted hard drive protocols, and the encrypted hard drive protocols use the internal disk storage area to maintain an internal disk state;

wherein the internal disk storage area is implemented as a dedicated block backend, wherein the dedicated block backend includes one or more in-memory band states comprising a persisted part and a runtime-only part; and generating an encryption key internally to the internal disk storage area such that the encryption is inaccessible to a host associated with the virtual disk.

2. The method of claim 1, wherein the dedicated block backend exposes capability to perform system input/output operations to a header of a block device.

3. The method of claim 1, wherein the dedicated block backend includes a first backend for writing disk-internal data to the internal disk storage area, and a second backend implements the encrypted hard drive protocols.

4. The method of claim 3, wherein the second backend is stacked above the first backend.

5. The method of claim 3, further comprising:
accepting, by a virtio-SCSI layer, secure protocol requests;
translating, by the virtio-SCSI layer, the secure protocol requests into logical requests; and
providing the logical requests to the first backend.

6. The method of claim 1, wherein the internal disk storage area is not directly accessible by a guest operating system.

7. The method of claim 6, further comprising:
receiving, at a block backend, an input/output request from the guest operating system;
adjusting an input/output offset for the input/output request by incrementing the input/output offset by a size of the internal disk storage area; and
processing the input/output request.

8. The method of claim 7, wherein the size of the internal disk storage area is obtained from the virtual machine.

9. The method of claim 1, further comprising storing, at a front of a virtual disk storage device of the virtual disk storage system, band metadata.

10. The method of claim 9, further comprising modifying a state of a band of the virtual disk storage device concurrently with input/output from the virtual disk.

11. The method of claim 9, wherein the virtual disk storage device treats the band metadata as part of disk content.

12. The method of claim 10, further comprising appending a record onto a log file and maintaining a mapping reference of the input/output.

13. The method of claim 9, further comprising folding the band metadata into a data storage domain for storing disk data.

14. A virtual disk instantiated by a virtual machine, comprising:
a storage device associated with the virtual disk; and
wherein the virtual disk comprises:
a virtual disk backend including the virtual disk and an internal disk storage area;
a system area backend providing an interface to the internal disk storage area and an interface to the virtual disk, and
a secure block backend stacked above the system area backend, the secure block backend providing encrypted hard drive protocol support, the secure block backend using the internal disk storage area to maintain an internal disk state;
wherein the internal disk storage area is implemented as a dedicated block backend, wherein the dedicated block backend includes one or more in-memory band states comprising a persisted part and a runtime-only part; and
wherein the internal disk storage area has an encryption key generated internally such that the encryption is inaccessible to a host associated with the virtual disk.

15. The virtual disk of claim 14, further comprising a virtio-SCSI layer implemented above the secure block backend.

16. The virtual disk of claim 14, wherein the secure block backend controls changes to a state of a band within the virtual disk.

17. The virtual disk of claim 16, wherein the internal disk storage area includes band metadata corresponding to the band within the virtual disk.

18. A system for supporting encrypted hard drives in a virtual disk storage system, the system comprising:
a host device capable of supporting one or more virtual machines within a network computing architecture, the one or more virtual machines adapted to:
receive a request to create a virtual disk instance that supports encrypted hard drive protocols;
instantiate a virtual disk on a storage device in response to the request;
create an internal disk storage area in the virtual disk, the internal disk storage area being exposed to a controller of the virtual disk, wherein the internal disk storage area is used to implement the encrypted hard drive protocols, and the encrypted hard drive protocols use the internal disk storage area to maintain an internal disk state, and the internal disk storage area is implemented as a dedicated block backend, wherein the dedicated block backend includes one or more in-memory band states comprising a persisted part and a runtime-only part; and
generate an encryption key internally to the internal disk storage area such that the encryption is inaccessible to a host associated with the virtual disk.

19. The system of claim 18, wherein the dedicated block backend exposes capability to perform system input/output operations to a header of a block device.

20. The system of claim 18, wherein the dedicated block backend includes a first backend for writing disk-internal data to the internal disk storage area, and a second backend implements the encrypted hard drive protocols.

21. The system of claim 20, wherein the second backend is stacked above the first backend.

22. The system of claim 18, wherein the internal disk storage area is not directly accessible by a guest operating system.

23. The system of claim 22, wherein input/output requests received from the guest operating system are modified by incrementing an input/output offset by a size of the internal disk storage area.

24. The system of claim 18, wherein the internal disk storage area includes band metadata corresponding to bands of data in the virtual disk.

25. The method of claim 1, wherein the dedicated block backend is positioned at a head of the internal disk storge area.

26. The system of claim 18, wherein the dedicated block backend is position at a head of the internal disk storage area.

* * * * *